United States Patent [19]

Barry

[11] Patent Number: 4,951,374

[45] Date of Patent: Aug. 28, 1990

[54] BUSHING INSTALLATION TOOL

[75] Inventor: William E. Barry, Brookfield, Wis.

[73] Assignee: Speed Systems, Inc., Waukesha, Wis.

[21] Appl. No.: 192,008

[22] Filed: May 9, 1988

[51] Int. Cl.$^5$ ................................................ B23P 19/04

[52] U.S. Cl. ........................................... 29/240; 29/256

[58] Field of Search ........................ 29/240, 240.5, 234, 29/235, 256, 280, 282

[56] References Cited

U.S. PATENT DOCUMENTS 4,308,661 1/1980 Hallstrom ............................ 29/252

4,361,943 12/1982 Kobusch .............................. 29/240

*Primary Examiner*—J. J. Hartman

*Attorney, Agent, or Firm*—Foley & Lardner

[57] ABSTRACT

A bushing installation tool including a cylindrical housing adapted to be mounted on said bushing, a cap mounted on one end of the housing, a number of slots in the other end of the housing, a quick release strap assembly mounted on the other end of the housing for securing the housing to the bushing, a limited torque type ratchet wrench mounted on the cap for rotating the bushing into a bushing well, and a hexagonal nut mounted on the cap for rotating the housing in the other direction to remove the bushing from the well.

15 Claims, 2 Drawing Sheets

BUSHING INSTALLATION TOOL

FIELD OF THE INVENTION

The present invention relates to a bushing installation tool for installation and removal of a bushing from a bushing well in an electrical distribution transformer and more particularly to a one way ratcheting tool having a preset torque to prevent damage to a bushing or well.

DESCRIPTION OF THE PRIOR ART

Electrical distribution transformers are provided with a bushing well in the front plate at the point of manufacture for supporting bushing inserts of different voltage ratings. The bushing insert is installed into a mating socket provided in the bushing well. The bushing well has a ⅜-16 threaded copper stud in the center of the socket that threads into the bushing insert as it is screwed into the bushing well. This ⅜-16 stud connection acts as the current interchange between the bushing insert and the bushing well.

The bushing well insert/bushing well concept has been used since the early 60's and has always presented a problem of breaking the well studs due to overtorqueing of the bushing insert at the time of installation. A broken well stud in the insert-well connection will cause an immediate failure of the transformer. Difficulty has also been encountered in attempting to remove the bushing insert from the bushing well. Once a transformer has been in service for a number of years, the bushing insert often seizes in the well due to the migration of silicone grease used during initial installation of the bushing insert in the bushing well away from the insert well interfaces. In order to remove from the well the insert from the only place any force can be applied is to the bushing insert itself. This often results in damage to the bushing insert on removal from the well.

SUMMARY OF THE PRESENT INVENTION

A principal feature of the present invention is the provision of a tool which provides torque control of the bushing insert during installation so as to prevent breakage of the stud in the bushing well while at the same time assuring a sufficient tight electrical connection.

Another principal feature of the present invention is to provide a tool which can be mounted on the bushing insert with sufficient force to prevent slippage or mechanical damage to the insert while allowing the insert to be sufficiently tightened in the bushing well.

A further feature of the present invention is the provision of a preset torque force that prevents overtightening or undertightening of the bushing in the well.

Another principal feature of the invention is to provide a tool which can also be used to remove the bushing insert from the bushing well without damaging the bushing insert. These features have been achieved by providing a tool which combines a preset torque wrench along with a flexible filament wound fiberglass tube which can be mounted on the shoulder of the bushing insert by means of a clamp. A probe is provided in the tool to center the tool on the bushing insert and thereby provide greater stability between the tool and bushing insert. A hexagonal nut is provided at the end of the tool to provide a wrench surface for use in removal of the bushing insert from the well.

Other principal features and advantages of the invention will become apparent to those skilled in the art upon review of the following detailed description, claims and drawings.

Figure 5:
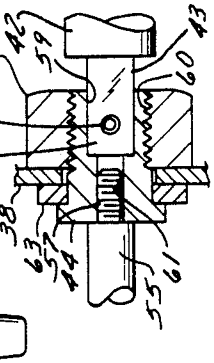
FIG. 5 is a view party in section of the mounting arrangement for the torque wrench.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood, that the phraseology and terminology used herein is for the purpose of description and should not be regarded as limiting.

DETAILED DESCRIPTION OF THE INVENTION

Figure 2:
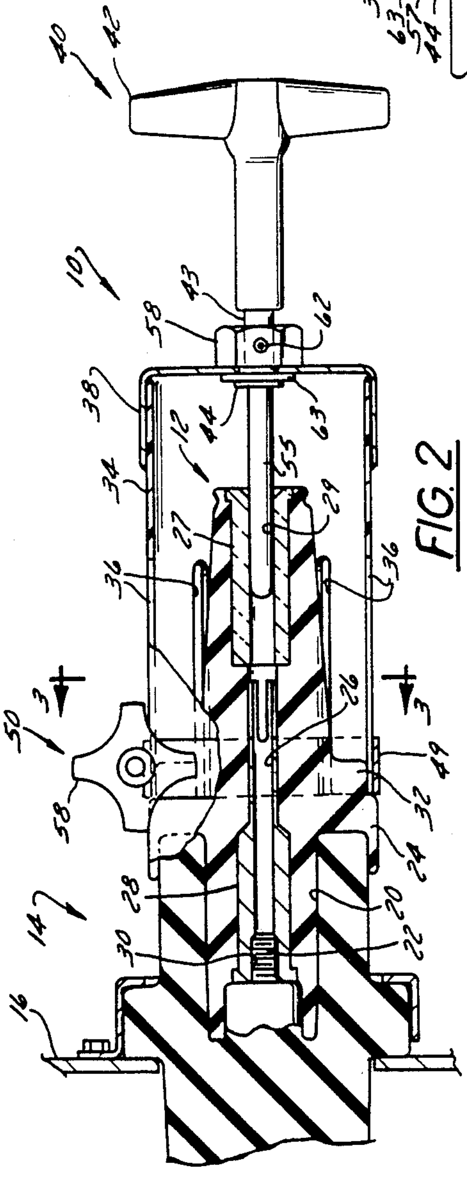
FIG. 2 is a side elevational view in section showing the installation tool mounted on the bushing insert which is positioned in a bushing well.
Figure 1:
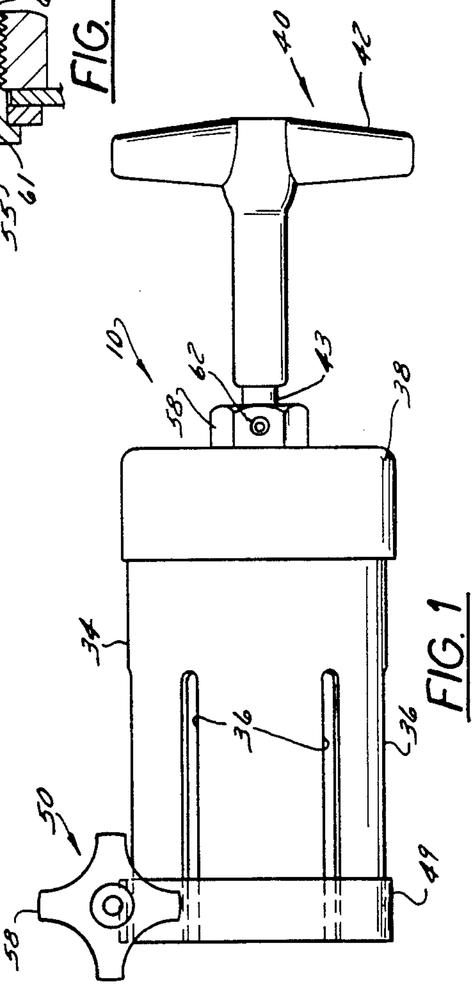
FIG. 1 is a side elevational view of the installation tool according to the present invention.
Figure 3:
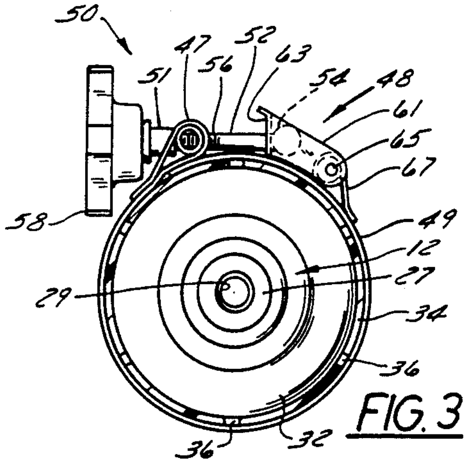
FIG. 3 is a view taken on line 3—3 of FIG. 2 showing the clamping arrangement for the insert.

The bushing installation tool 10 as shown in FIGS. 1 and 2 is used to install or remove a bushing insert 12 from a bushing well 14 shown mounted on the front plate 16 of an electrical apparatus such as a distribution transformer. The bushing well 14 is formed of a epoxy like material and includes a central cavity 20. A copper stud 22 is mounted in the center of the cavity 20 and is electrically connected to the electrical apparatus through the plate 16.

The bushing insert 12 is formed of an elastomeric material such as rubber and includes a housing 24 having a central bore 26. An arc extinguishing insert 27 having a bore 29 is provided in one end of bore 26. An electrically conductive tube 28 is mounted in the other end of the bore 26. The tube 28 includes a threaded socket 30 at one end which is screwed onto the threaded stud 22. The bushing insert is provided with a shoulder 32 intermediate the ends which is used for engagement with a line connector (not shown).

In accordance with the invention, the tool 10 includes a filament wound fiberglass tubular housing 34 having a series of axially extending slots 36 around one end. The housing is closed at the other end by means of a metal cap 38. A hexagonal nut 58 having a threaded opening 60 is mounted on a threaded brass insert 44 provided in the center of the cap 38. As shown in FIG. 5, the brass insert 44 has a bore 59 at one end and a threaded bore 61 at the other end. The brass insert is seated on a steel washer 63.

Means are provided on the cap 38 for rotating the housing 34 to screw the socket 30 in the bushing insert onto the stud 22 in the bushing well. Such means is in the form of a torque wrench 40 having a preset torque value which prevents overtightening of the bushing insert 12. The torque wrench 40 is a conventional ratchet type wrench which includes a handle 42, a rod 43 extending out of the handle 42 and a conventional one way ratchet assembly located in the handle 42. The ratchet assembly is a typical one way torque type device which releases when a preset torque is applied to the cap.

Figure 4:
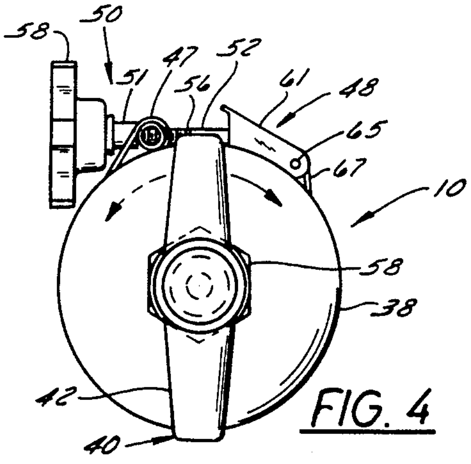
FIG. 4 is a top view of the installation tool.
Figure 6:
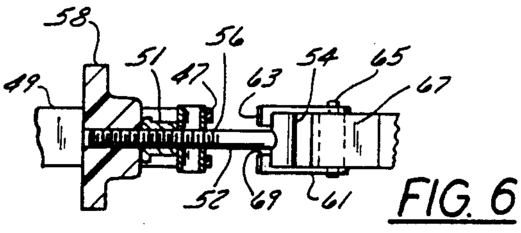
FIG. 6 is a view of the release assembly.

The torque wrench 40 is mounted on the cap 38 by means of a stud 45 provided on the end of the rod 43. The stud 45 is inserted into the bore 59 in the brass insert and is secured therein by means of the roll pin 62 which passes through the nut 58, insert 44 and stud 45. As seen in FIG. 4, the handle 42 is rotated clockwise to screw the bushing into the well and is turned counterclockwise, independent of the housing, to reset the ratchet for tightening.

Means can be provided on the cap 38 for aligning and stabilizing the housing 34 on the bushing insert 12. Such means is in the form of a probe 55 which has a threaded extension 57 which screwed into the threaded bore 61 in the insert 44. The probe 55 is aligned with the opening 26 in the bushing insert.

Means are provided for tightening the housing onto the shoulder 32. Such means is in the form of a metal clamp which is wrapped around the end of the housing 34. The clamp includes a metal strap 49 having a quick release assembly 48 mounted on one end of the strap and a threaded screw and nut assembly 50 mounted on the other end of the strap. The assembly 50 includes a tubular T connector 51 mounted on the end of strap 49 by strips 47. A pin 52 is extended through the T connector 51 and includes a cross member 54 at one end and a threaded section 56 at the other end.

The release assembly 48 includes a pivot member 61 having a front plate 63 and a pivot pin 65. The pivot pin 65 is secured to strap 49 by a strip 67. A slot 69 is provided in the front plate 63.

The pin 52 is operatively connected to the release assembly 48 by inserting the pin 52 into the slot 69 in the front plate 63 with the cross member 54 seated on the inside of the front plate 63. A threaded knob 58 is mounted on the end of the threaded section 56 and is rotated to draw the strap 49 into tight engagement with the outside surface of the housing 34 so that it is seated on the shoulder 32.

Means are provided on the cap for removing the bushing insert from the bushing well for replacement or repair. Such means is in the form of the hexagonal nut 58 which is secured to the insert 44 on the cap 38. The nut 58 provides a means for attaching a wrench to the cap for rotating the housing in the opposite direction to unscrew the bushing insert 12 off of the threaded stud 22 without damaging the bushing insert 12.

Thus, it is apparent that there has been provided, in accordance with the invention, a bushing installation tool that fully satisfies the aims and advantages set forth above. While this invention has been described in conjunction with specific embodiments thereof, it is evident that many alternatives, modifications and variations will be apparent to those skilled in the art. Accordingly, it is intended to embrace all such alternatives, modification and variations as fall within the spirit and broad scope of the appended claims.

The embodiments of the invention in which an exclusive property or privilege is claimed, are defined as follows:

1. A bushing installation tool for mounting a bushing insert in a bushing well, the bushing insert includes an elastomeric housing having a central bore, an electrically conductive tube in the bore having a threaded socket at one end and a cylindrical shoulder on the exterior of the housing proximate one end of the housing, the bushing well including a threaded stud corresponding to the threaded socket, said tool comprising:

a cylindrical housing, said housing being mounted on the cylindrical shoulder of the bushing insert, clamming means for securing said housing to the shoulder of the bushing insert, a ratcheting type torque wrench mounted on said housing for rotating said housing in one direction to screw the threaded socket in the tube onto the threaded stud in the bushing well, said wrench having a predetermined torque capacity to prevent overloading of said bushing insert in said wall.

2. The tool according to claim 1 including means mounted on said cylindrical housing for rotating the elastomeric housing in the opposite direction to release the threaded socket in the bushing insert from the threaded stud in the bushing well.

3. The tool according to claim 2 wherein said rotating means comprises a hexagonal nut.

4. The tool according to claim 1 including means for stabilizing said housing on the bushing insert.

5. The tool according to claim 4 wherein said stabilizing means comprises a probe mounted on said cap inside of said housing in axial alignment with the central base in the bushing insert.

6. The tool according to claim 1 wherein said housing comprises a cylindrical member formed of a flexible plastic material having a cap mounted on one end of said member.

7. The tool according to claim 6 wherein said securing means includes a strap wrapped around the other end of said cylindrical member and an adjustable release assembly operatively connected to said strap for closing the open end of said cylinder on said insert.

8. The tool according to claim 7 including a probe mounted on the inside of said cap in axial alignment with the central bore of the bushing insert.

9. The tool according to claim 8 including means mounted on said cap for rotating said housing in the opposite direction.

10. A bushing installation tool for mounting a bushing insert having a threaded socket onto a threaded stud in a bushing well the bushing insert including an elastomeric housing having a cylindrical shoulder proximate one end of the elastomeric housing, said tool comprising:

a tubular housing which is mounted on he shoulder of the housing of the bushing insert, means mounted on said tubular housing for clamping said housing onto the bushing insert, ratcheting torque means having a predetermined torque capacity mounted on said tubular housing for screwing the threaded socket in the bushing insert onto the threaded stud in the bushing well, and means mounted on said tubular housing for unscrewing the bushing insert from the bushing well.

11. The tool according to claim 10 wherein said tubular housing is formed from a flexible plastic material having a number of slots in one end, said clamping means being mounted on said one end of said housing, said housing being clamped to said bushing insert by squeezing said housing to close said slots.

12. The tool according to claim 10 wherein said unscrewing means comprises a hexagonal nut mounted on said cap.

13. The tool according to claim 10 or 11 including a probe for stabilizing said housing on the bushing insert.

14. A bushing installation tool for mounting a bushing insert onto a bushing well, the bushing insert including an elastomeric housing having a central bore, and an electrically conductive tube in the bore having a threaded socket at one end and a cylindrical shoulder proximate one end of the elastomeric housing, the bushing well including a threaded stud, said tool comprising, a cylindrical housing formed from a flexible plastic material having a number of slots in one end, a cap mounted on the other end of said housing, a clamp assembly mounted on said one end of said housing for securing said housing onto the cylindrical shoulder of said bushing insert, a hexagonal nut mounted on said cap for rotating said cylindrical housing in one direction, and a limited torque ratchet wrench mounted on said nut for turning said cylindrical housing in the other direction to screw the threaded socket in the bushing insert onto a threaded stud in the bushing well, said wrench being set to release when a predetermined torque is exerted on the bushing insert.

15. The bushing insert according to claim 14 including a probe mounted on the inside of said cap for stabilizing said housing on the bushing insert.

* * * * *